Oct. 15, 1963

J. H. GORNDT ET AL 3,106,965

ROTOR HEAD

Filed Oct. 2, 1961

2 Sheets-Sheet 1

INVENTORS
John H. Gorndt
Robert R. Peterson
BY Warren L. Schmidt

Ralph Hamman
ATTORNEY 3,106,965
ROTOR HEAD
John H. Gorndt, Robert R. Peterson, and Warren E. Schmidt, all of Erie, Pa., assignors to Lord Manufacturing Company, Erie, Pa., a corporation of Pennsylvania
Filed Oct. 2, 1961, Ser. No. 142,223
3 Claims. (Cl. 170—160.53)

This invention is a rotor head for helicopters, autogyros and the like which in a preferred form eliminates the blade thrust bearings, the drag and flapping hinges and associated hardware and the damper. The functions of these parts is performed by an elastomeric joint connecting each of the blades to the rotor shaft.

Figure 1:
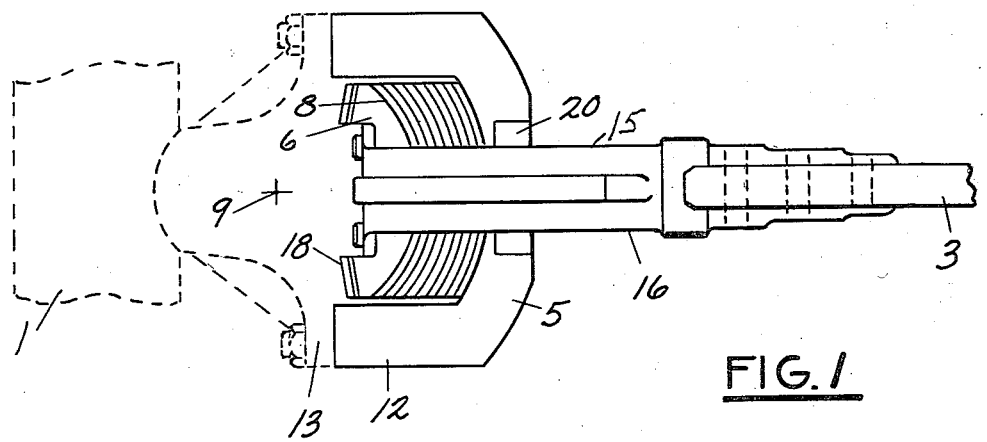
Figure 3:
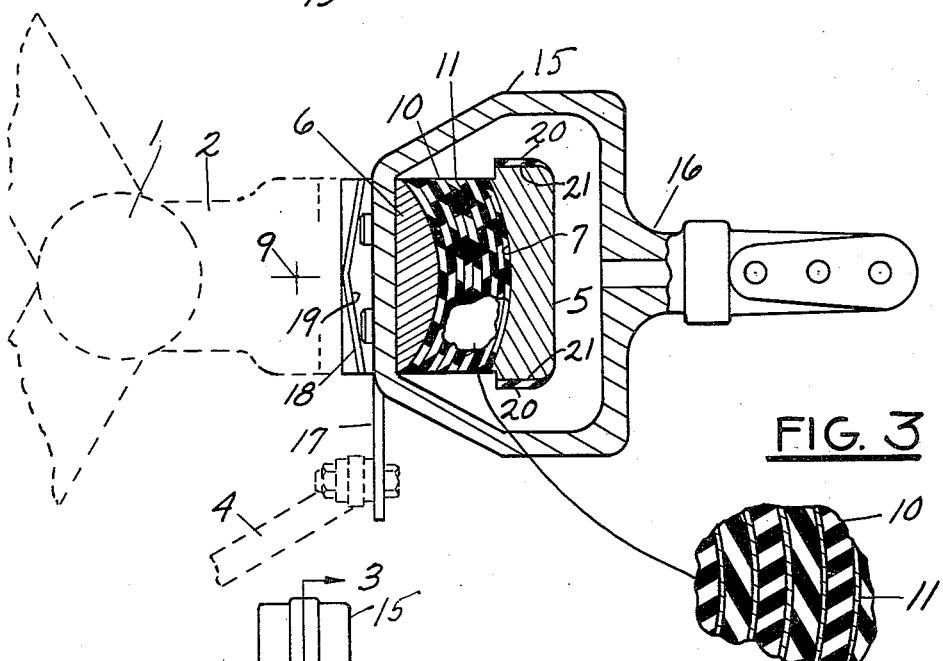
Figure 4:
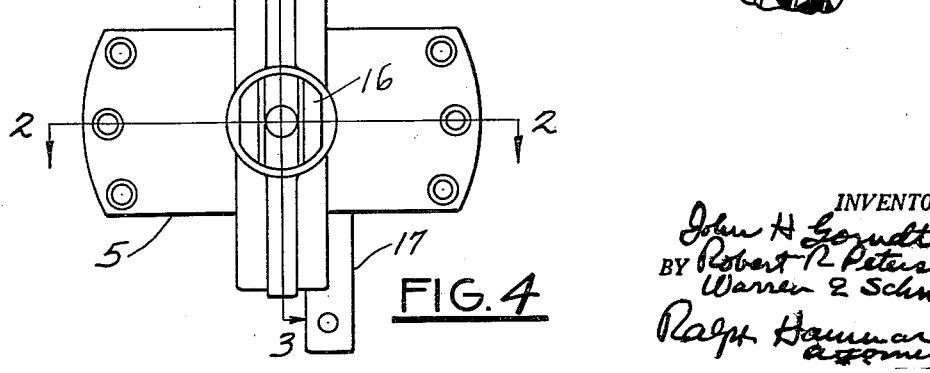
Figure 2:
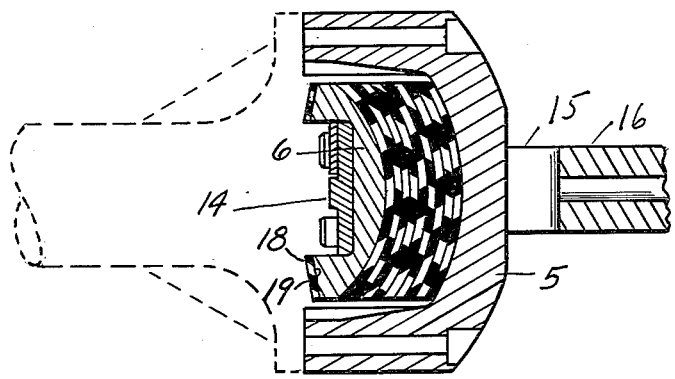

In the drawing, FIG. 1 is an elevation of a helicopter rotor head, FIG. 2 is a section on line 2—2 of FIG. 4, FIG. 3 is a top plan view of the rotor head in section on line 3—3 of FIG. 4, and FIG. 4 is an end view.

In the drawing, 1 indicates the helicopter rotor shaft hub having a plurality of radially projecting arms 2, each of which carries a blade 3. The rotor shaft is driven by the usual transmission. Associated with each of the blades is a pitch control linkage 4 driven at the same speed as the rotor and rotating the blade about the axis of the arm 2 to vary its pitch. In addition to rotation about the axis of the arm, each of the blades has a flapping motion about an axis in a horizontal plane through the associated arm and a lead-lag or drag motion about an axis in a vertical plane through the arm. The huge centrifugal forces acting on the blades cause early failure of conventional bearings for accommodating the described motions.

In the preferred form of the invention illustrated in FIGS. 1 to 4 inclusive, all of the various motions of the helicopter blades are accommodated by an elastomeric sandwich joint which in addition supplies sufficient damping so that the usual damper may be eliminated.

The joint comprises spaced members 5 and 6 having opposed spherical surfaces 7 and 8 centered at a suitable point 9 about which the blades are to oscillate. The position of the point 9 may be varied along the axis of the blade as desired in order to provide the desired stiffness in the lead-lag and flapping modes. It is not essential that the surfaces 7 and 8 be spherical or that the surfaces be centered on the same point. It is, however, essential that the surfaces 7 and 8 be transverse to the axis of the blade so that the centrifugal load is taken in compression by a body 10 of suitable elastomer sandwiched between and bonded to the surfaces 7 and 8. A plurality of shims or plates 11 of metal or other suitable non-extensible material are spaced throughout and bonded to the body 10 transverse to the centrifugal load. The shims 11 prevent bulging of the body 10 under compression load and thereby increase the stiffness. The shims do not vary the stiffness of the rubber body 10 in shear and accordingly do not affect the resilience of the joint for the torsional (pitch), lead-lag and flapping modes. The shims do greatly increase the stiffness of the joint so far as the centrifugal load is concerned. The particular joint illustrated is softest in the torsional (pitch) direction about the axis of the blade where there is a pure shearing action between the members 5 and 6. The joint is stiffer but is still relatively soft, in hinging (lead-lag, flapping) directions about axes normal to the axis of the blade where there is a tilting action of the member 5 relative to the member 6 resulting in a stress on the elastomer which is a combination of shear, tension and compression. The blade, however, is exceedingly stiff in the compression direction along the axis of the blade because of this direction the load is taken wholly in compression and bulging of the elastomer is substantially prevented. The joint can have the same stiffness in torsion (pitch), lead-lag and flapping. The illustrated joint is stiffer in lead-lag and flapping because some damping is desired in these modes while none is desired in pitch.

The member 5 of the mounting is of C-shape with the ends 12 bolted to a drive flange 13 on the arm 2. The member 6 is bolted to the base 14 of a yoke 15 which extends through the C-shaped member 5 in a plane at right angles to the plane of the member 5. The yoke 15 has a hub 16 to which the blade 3 is bolted. An arm 17 for connection with the pitch control linkage 4 is suitably connected to the yoke.

The torsional motion of the blade is controlled by the linkage 4. This is the direction in which the joint is softest or offers the least restraint. The motion of the blade in a lead-lag or flapping mode is influenced by the stiffness and damping of the joint. Motion in these directions is limited, for example, to plus or minus ten degrees by bodies 18 of suitable elastomer bonded to surfaces 19 on the member 6 and by bodies 20 of elastomer bonded to the surfaces 21 of the member 5 presented to the yoke 15. These provide cushioned stops snubbing or limiting the angular excursion of the blade in the lead-lag and flapping modes. The bodies 18 cooperate with the drive flange 13 to limit the excursion in the flapping mode. The bodies 20 cooperate with the yoke 15 to limit the excursion in the lead-lag mode. By varying the elastomer the damping can equal, exceed or be less than the damping in the typical existing damper. In addition, the damping in this part will increase with displacement instead of being constant as is the friction damper. This is quite important since under small lag deflections little or no damping is required, but to reduce the large deflections when the blade is in or near a resonant condition the maximum amount of damping is required. The typical frictional lag damper is set by compromising the maximum amount of damping the system can stand under small load conditions with the minimum amount of damping required to prevent destructively large motions under resonant load conditions. There is some deflection of the elastomer under centrifugal force which supplies some resilience and damping between the centrifugal force from the blade and the shaft.

The spring rates of the joint in the various modes may be varied considerably, either collectively or independently, with little or no change in the overall space envelope.

What is claimed as new is:
1. A rotor head comprising a rotor shaft hub having a plurality of drive arms, each for a blade having a radially extending axis, a joint between the blade and its associated arm comprising a member fixed to the blade having a surface transverse to said axis and spaced from and presented toward the blade and away from the associated arm, another member fixed to said arm having a surface transverse to said axis and spaced radially outward of and presented toward said first surface, a plurality of plates of nonextensible material transverse to and spaced along said axis between said surfaces, layers of elastomer interspersed between said plates and between said plates and said surfaces and bonded to said plates and surfaces, and pitch control means connected to said first member for twisting the first member relative to said other member to control the pitch of the blade.

2. A rotor head comprising a rotor shaft hub having a plurality of drive arms, each for a blade having a radially extending axis, a joint between the blade and its associated arm comprising a yoke fixed to the blade having a surface transverse to said axis and spaced from and presented toward the blade and away from the associated arm, another yoke fixed to said arm having a surface transverse to said axis and spaced radially outward of and presented toward said first surface, said yokes being linked through each other and lying respectively in intersecting planes, a body of elastomer sandwiched between and bonded to said surfaces, a plurality of spaced plates of nonextensible material transverse to said axis and dispersed in and bonded to said elastomer for preventing bulging of the elastomer under compression load and thereby increasing the resistance to centrifugal force on the blade, and pitch control means connected to the first yoke for twisting the first yoke relative to said other yoke to control the pitch of the blade.

3. A rotor head comprising a rotor shaft hub having a plurality of drive arms, each for a blade having a radially extending axis, a joint between the blade and its associated arm comprising a member fixed to the blade having a spherical surface transverse to said axis and spaced from and presented toward the blade and away from the associated arm, another member fixed to said arm having a spherical surface transverse to said axis and spaced radially outward of and presented toward said first surface, said spherical surfaces being concave toward the hub, a plurality of plates of nonextensible material transverse to and spaced along said axis between said surface, layers of elastomer interspersed between said plates and between said plates and said surfaces and bonded to said plates and surfaces, and pitch control means connected to said first member for twisting the first member relative to said other member to control the pitch of the blade.

References Cited in the file of this patent

UNITED STATES PATENTS

| | | |
|---|---|---|
| 2,193,498 | Stanley | Mar. 12, 1940 |
| 2,394,460 | Martinotti | Feb. 5, 1946 |
| 2,631,680 | Compte | Mar. 17, 1953 |

FOREIGN PATENTS

| | | |
|---|---|---|
| 934,336 | France | Jan. 10, 1948 |